Patented Nov. 16, 1926.

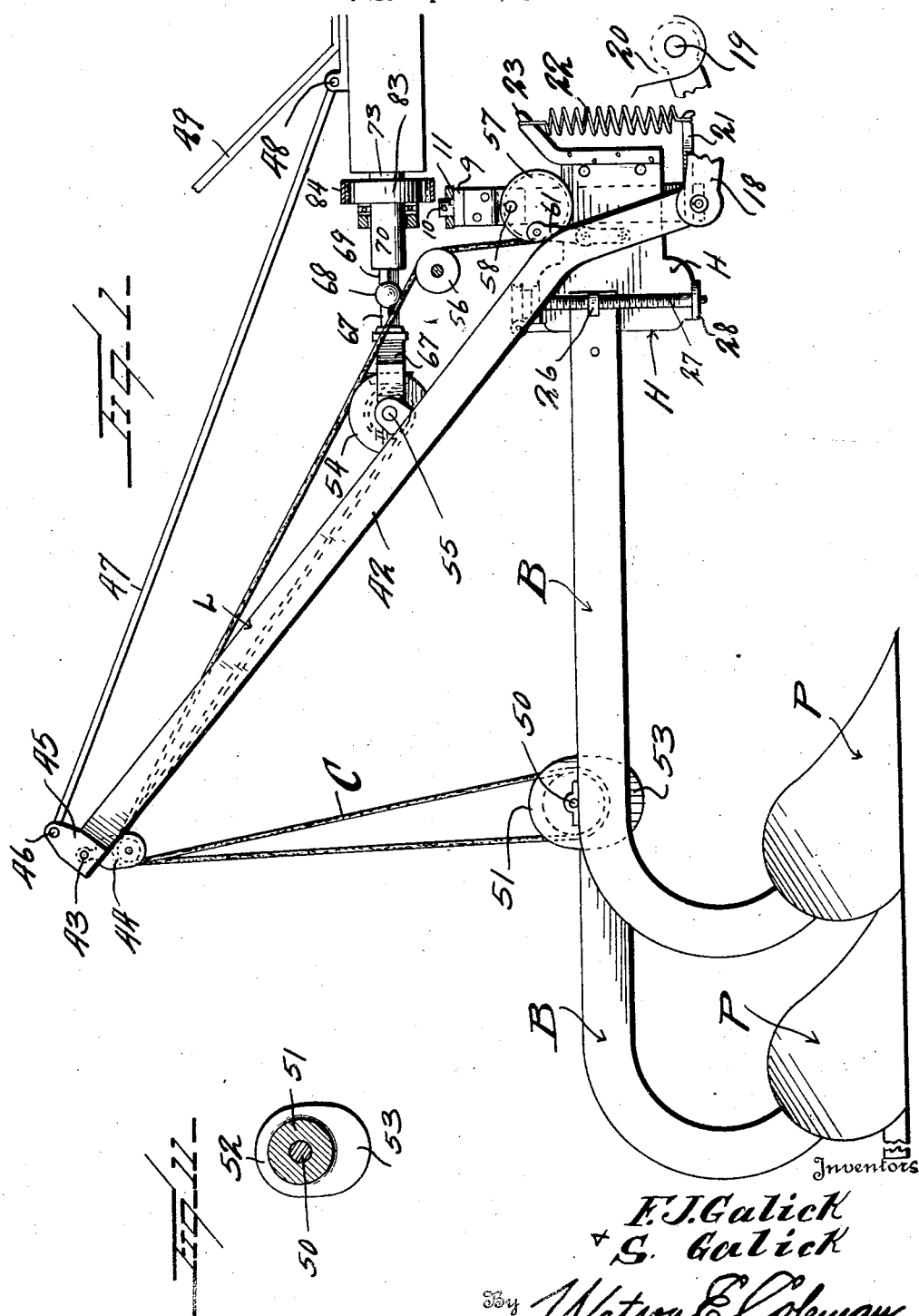

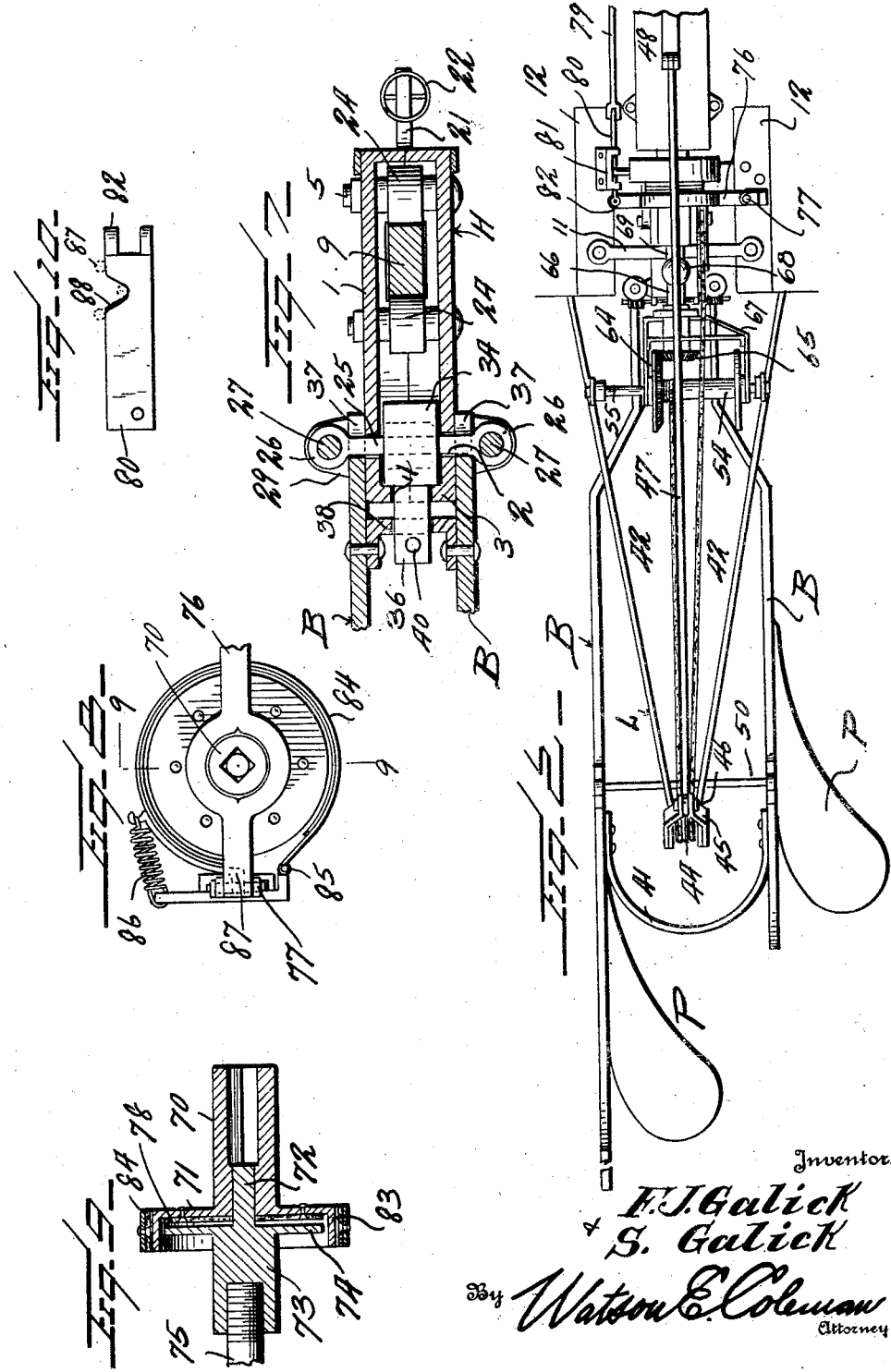

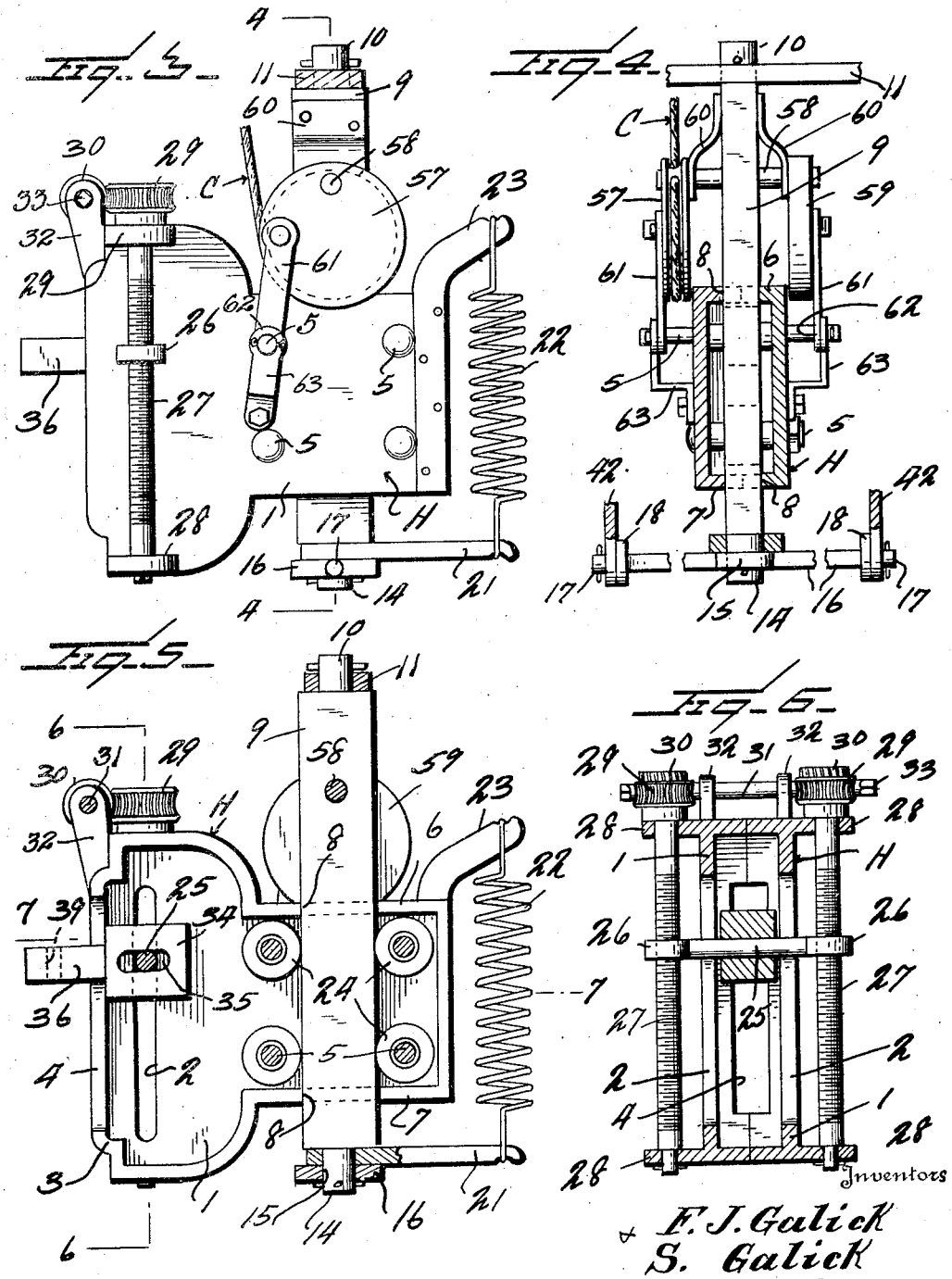

1,607,452

UNITED STATES PATENT OFFICE.

FRANK J. GALICK AND STEPHEN GALICK, OF WHITEHALL, NEW YORK.

AGRICULTURAL IMPLEMENT.

Application filed April 2, 1925. Serial No. 20,200.

This invention relates to certain improvements in agricultural implements and it is an object of the invention to provide a device of this general character adapted to be hitched to a tractor or other vehicle together with means whereby the ground working elements may be readily and conveniently moved or adjusted into an inoperative position.

Another object of the invention is to provide an implement of this general character employing plows or kindred ground working elements together with means whereby the depth of penetration of said plows or elements may be regulated or adjusted.

Another object of the invention is to provide an implement of this general character adapted to be hitched to a tractor or the like together with power means upon the tractor for moving the ground working elements into an inoperative position and wherein means is also provided for maintaining the elements in such inoperative position.

It is also an object of the invention to provide an implement of this kind adapted to be operatively connected with a hitch mechanism, said connection comprising a coupler medium breaking upon abnormal resistance being offered to the implement or more particularly the ground working elements carried thereby.

It is an essential object of the invention to provide an implement of this kind having associated therewith a hitching means whereby the same may be coupled to a tractor or the like in a manner to assure a shorter turning radius and which also permits the use of the implement with a material reduction in draft.

A still further object of the invention is to provide an agricultural implement employing a plow or plows together with means for lifting the plows into an inoperative position, said means operating initially to move the plow or plows to dispose the point of the plow upwardly to reduce the resistance offered to the lifting movement of the plows.

The invention consists in the details of construction and in the combination and arrangement of the several parts of our improved agricultural implement whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in side elevation illustrating an agricultural implement constructed in accordance with an embodiment of our invention, the associated rear end of a tractor being shown partly in section and partly in elevation;

Figure 2 is a view in top plan of the structure as illustrated in Figure 1;

Figure 3 is an enlarged view partly in section and partly in elevation of the hitch as herein disclosed;

Figure 4 is a sectional view taken substantially on the line 4—4 of Figure 3;

Figure 5 is a view partly in longitudinal vertical section and partly in elevation of the hitch as herein set forth;

Figure 6 is a sectional view taken substantially on the line 6—6 of Figure 5;

Figure 7 is a sectional view taken substantially on the line 7—7 of Figure 5, with the forward end portion of the beams of the implement coupled thereto;

Figure 8 is a detail view in elevation of the brake and clutch mechanism herein employed;

Figure 9 is a sectional view taken substantially on the line 9—9 of Figure 8;

Figure 10 is a view in elevation of the operating member for the clutch and brake unapplied.

As disclosed in the accompanying drawings, H denotes a hitch block of requisite configuration and dimensions, said block being hollow and provided in its side walls 1 with the elongated slots 2 and in its front wall 3 with the elongated slot 4. The block H preferably comprises two duplicate sections adapted to be arranged side by side and held in requisite assembly by the bolts 5 or other suitable fastening means.

The block H forwardly of the slots 2 is provided in its top wall 6 and its bottom wall 7 with the aligned openings 8 whereby the block H may be slidably disposed on the vertically directed pin 9, said pin 9 being preferably angular in cross section with the openings 8 of corresponding formation so that the pin 9 is incapable of rotary movement independently of the block H. The upper end portion of the pin 9 is provided with an outstanding cylindrical stud or extension 10 which is disposed through a cross member 11 connecting the upper platform brackets 12 comprised in the tail end structure of a tractor or kindred vehicle, said member 11 providing a mounting for the upper end portion of the pin 9.

The lower or opposite end portion of the pin 9 is also provided with an outstanding stud or extension 14 which is directed through a vertically disposed slot 15 provided in the central portion of a cross bar 16, the extremities of the bar 16 being provided with the outstanding trunnions 17 with each of which is operatively engaged a link 18, said link being also operatively engaged, as at 19, with the lower hitch member 20 carried by the rear end of the tractor or kindred vehicle.

Engaged with the lower stud or extension 14 above the bar 16 is an end portion of an arm 21 of a length to terminate beyond the front of the block H and suitably affixed to the outer or free extremity of the arm 21 is an end portion of a retractile spring 22 the opposite end portion of which being secured to the forwardly disposed bracket 23 carried by the block H, said spring 22 being of requisite tension and operating to constantly urge downward pull upon the block H for a purpose to be hereinafter more particularly referred to.

Mounted upon the bolts 5 within the block H are the rollers 24 which have contact with the pin 9 and provide anti-friction means whereby the block H and the pin 9 may have requisite relative movement with a minimum of frictional resistance.

Disposed transversely of the rearward end portion of the block H is a bar 25 which extends outwardly of said block through the slots 2 and the extremities of the bar 25 are provided with the eye members 26 through each of which is threaded an elongated shank 27. Each of the shanks 27 is vertically disposed and has its extremities operatively engaged with the outstanding ears 28 carried by the side faces or walls of the block H.

The upper portions of the shanks 27 have fixed thereto the worm gears 29 meshing with the worms 30 fixed to the shaft 31. The shaft 31 is rotatably supported by the upstanding bearings 32 carried by the top wall of the block H and one end portion 33 of the shaft 31 is angular in cross section to permit the requisite engagement therewith of an operating crank to permit requisite rotation of the shaft 31 to effect the desired rotation of the shanks 27 to raise or lower the bar 25 as the occasions of practice may necessitate.

Arranged within the block H is a head 34 through which the bar 25 is disposed, the opening 35 in said head 34 being of a length sufficient to permit the passage therethrough of an eye member 26 whereby the requisite assembly of the structure may be facilitated. The head 34 is provided with an outstanding bar 36 preferably integral with the head 34 and which extends exteriorly of the block H through the slot 4, said bar 36 being adapted to be directly coupled with the beams B carrying the ground working elements P herein disclosed as plows.

The forward extremity of each of the beams B is provided with an open slot or kerf 37 which freely receives an extended portion of the bar 25 inwardly of an eye member 26 whereby the bar 25 is engaged with each of such beams B in a manner to impart vertical swinging movement to the forward end portion of a beam B in accordance with the direction of movement of the bar 25. This is of particular advantage as the depth of penetration of the plows P during a working operation may be readily and conveniently regulated in accordance with the requirements of practice.

The forward end portions of the beams B, a desired distance rearwardly of their front ends, are connected by an interposed cross member 38 through which passes the bar 36. This bar 36 adjacent its free extremity is provided with a suitable opening 39 through which is adapted to be disposed a breakable pin 40 of wood, cast iron or other suitable material so that when undue hindrance or obstruction is offered to the plows during a working operation this pin 40 will break and thereby prevent injury to the apparatus in its entirety.

It is to be understood that the beams B are to be of any length desired and of such configuration as best complies with the conditions. The rear end portions of the beams B are also preferably connected by the interposed cross member 41 to maintain the plows P in substantially a fixed relation.

While I herein disclose the use of two beams, it is to be understood that if desired this number may be increased and that each of said beams is adapted to carry a plow or other suitable ground working element.

Also operatively engaged with the trunnions 17 of the bar 16 are the inner and lower end portions of the side beams 42 comprised in the elevating or lifting boom L. These beams 42 extend upwardly in convergence and have their outer or converging end portions connected by a bolt 43 from which is suspended a double pulley 44. The outer or converging end portions of the beams 42 of the boom L are also provided with the upstanding brackets 45 connected by a bolt 46 with which is pivotally engaged an end portion of a brace bar 47. The opposite end portion of this bar 47 is pivotally connected, as at 48, to the rear end portion of the tractor. Such connection 48 may be under the seat post 49 or other suitable place. This brace bar 47 serves to maintain the boom L in substantially a fixed position with respect to the tractor or the like with which our improved device is employed.

The beams B at a suitable point thereon support a fixed shaft or cross member 50 on which is rotatably mounted a sheave or pulley 51 positioned substantially midway between the beams B. Each of the flanges 52 of the pulley 51 has a portion 53 thereof extended which normally, by gravity, is disposed downwardly. The portions 53 of these flanges serve as guides to prevent the flexible member or cable C disposed around the pulley 51 from becoming disengaged therefrom when said flexible member or cable is loose as when idling.

The stretches of the flexible member or cable C leading from the pulley 51 are disposed over the pulleys 44, one of said stretches leading to and winding around the drum 54. This drum 54 is mounted upon the shaft 55 supported by the beams 42 of the boom L. The second stretch of the flexible member or cable C passes over an idle guide pulley 56 suitably supported by the tail end portion of the tractor or the like (not shown) and leads to and winds around the drum 57. This drum 57 is eccentrically mounted upon the extended end portion of the shaft 58 disposed through the upper portion of the pin 9. The shaft 58 at the opposite side of the pin 9 has eccentrically mounted thereon a disc 59. The drum 57 and disc 59 are coincident one with the other and fixed to the shaft 58 so that the drum 57 and the disc 59 will have the same unitary movement. The extremities of the shaft 58 are braced or reinforced by the brackets 60 through which the shaft is disposed, each of said brackets being suitably anchored to a side face of the pin 9. Operatively connected with the peripheral portion of the drum 57 and the disc 59 and at substantially a quarter point with respect to the shaft 58 is an end portion of a pitman or rigid link 61 the opposite end portion of which being operatively connected, as at 62, to the extended portions of one of the bolts 5, said extended portions of this bolt being braced or reinforced by the brackets 63 secured to opposed side faces or walls 1 of the block H.

The pulley 54 is provided with a gear 64 meshing with a gear 65 carried by the outer end portion of a shaft section 66, said shaft section 66 being rotatably supported by a frame structure 67 in swinging or pivotal engagement with the stationary shaft 55. This shaft section 66 has universal connection, as at 68, with a shaft section 69 telescopically engaging an outstanding hollow trunnion 70 fixedly secured to the axial center of a disc 71. The telescoping portions of the shaft section 69 and the trunnion 70 are angular in cross section whereby the same are keyed for rotation one with the other but are capable of having movement one longitudinally of the other. The disc 71 is freely mounted on a stub shaft 72 extending outwardly from the axial center of a head 73, the outer end portion of said head being formed with an outstanding annular flange 74 for coaction with the disc 71 upon requisite endwise movement of the trunnion 70 whereby the head 73 and the trunnion 70 may be clutched for unitary rotation. The head 73 is adapted to be coupled to the take off shaft 75 or other driven part comprised in the structure of the tractor proper. The trunnion 70 is freely disposed through a cross member 76 having one end portion pivotally connected, as at 77, to the rear end portion of the tractor so that upon requisite swinging movement of the cross member 76 the disc 71 may be brought into clutching engagement with the flange 74 or freed therefrom. To facilitate this clutching action, the inner face of the disc 71 is provided with a brake lining 79 of preferred material. The desired movement of the cross member 77 is adapted to be manually effected by a pedal or the like positioned within ready access to the occupant of the seat (not shown) of the tractor, said connection from the pedal being preferably through the rod 79 to a slide 80 supported for movement by a suitably located bracket 81. The slide 80 has pivotal connection, as at 82, with the free end portion of the cross member 76.

The periphery of the disc 71 is defined by an outstanding annular flange 83 constituting a brake drum with which coacts a brake band 84. One end portion of this band 84 is fixed, as at 85, to a suitable part of the rear end of the tractor or the like at a point adjacent to the pivotal connection 77 and the band 84 is constantly urged into braking contact with the drum 83 by a retractile spring 86 secured at one end to the band 84 and at its opposite end to an adjacent portion of the rear end of the tractor proper. The free end portion of the band 84 is provided with an outstanding lug or ear 87 which, when received within the recess or notch 88 of the upper marginal portion of the slide 80, permits the band 84 to have requisite braking contact with the drum 83. However, upon endwise movement of the slide 80 in either direction, the side edges or walls of the notch or recess 88 will force the lug 87 outwardly and consequently release the brake band 84 with respect to the brake drum 83.

In practice and assuming the plows P to be working in the ground, as indicated in Figure 1, when it is desired to raise the plows P the slide 80 is moved forwardly resulting in release of the brake band 84 and throwing the disc 71 into clutching action with the flange 74 of the head 75 whereupon from the driving element 75 the drum 54 will be caused to rotate winding the flexible member or cable C therearound. The initial winding of the flexible member or cable C upon the drum 54 will rotate the pulley 57 and the disc 59 until the pitmen 61 reach the limit of their upward movement. This action causes an intial upward swinging movement of the beams B and more particularly of the plow points P so that as the drum 54 continues to rotate to wind the cable or flexible member C therearound the beams B will be raised or lifted to their desired position with a minimum of resistance being offered by the plows P. After the beams B have been raised to a desired height, the slide 80 is released permitting the lug 87 to return within the notch or recess 88 resulting in the proper application of the brake band 84. When it is desired to lower the beams B, which is accomplished by gravity, pull is imposed upon the pedal or in other words the slide 80 is moved in the direction opposite from that when setting the clutch.

When the plows are working, the slot 15 hereinbefore referred to permits the requisite lateral swinging movement of the beams B and the plows P so that said plows will automatically level themselves. This is of particular advantages at the starting of a land.

The spring 22 hereinbefore referred to and as hereinbefore stated constantly urges the block H downwardly of the pin 9 and thereby assures the plows P penetrating the ground to the desired depth or position as effected by an adjustment of the bar 25.

With a farming implement constructed as hereinbefore set forth it has been found in practice that a turn may be made in an extremely small radius and that the implement is drawn during its work with materially reduced draft. By the use of our improved implement it is possible with the use of a tractor to carry a furrow up close to the fence, into corners and other places generally inaccessible even with a horse drawn team.

From the foregoing description it is thought to be obvious that an agricultural implement constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. In combination, a portable structure, a plow or plows, a coupling connecting the plow or plows to the portable structure, said coupling comprising a stationary element and a hitch block movable thereon, and coacting means carried by the portable structure, plow or plows and the hitch block operating in sequence from a common source of power for first moving the block to tilt the point of the plow or plows upwardly and then elevating the plow or plows.

2. In combination with a portable structure, means for connecting a hitch block therewith, said block being hollow and having vertically disposed slots in its side walls and rear wall, a bar extending through the hitch block and having movement within the slots in the side walls thereof, means carried by the block and engaging the opposite end portions of the bar for moving the bar lengthwise of the slots in the side walls of the block, a head within the block and through which the bar extends, said head having a bar extending out through the slot in the rear wall of the block, an agricultural implement, and means for coupling the bar of the head to said implement.

3. In combination with a portable structure, a vertically disposed pin supported thereby, a hitch block slidably mounted on said pin, a laterally disposed arm carried by the pin below the block, a retractile spring operatively engaged with said arm and block for constantly urging the block downwardly, an agricultural implement, and means for coupling the same to the hitch block.

4. In combination with a portable structure, a pin supported thereby, an operative connection between the lower portion of the pin and the portable structure, a boom operatively engaged with the lower portion of the pin, a brace coacting with the boom and portable structure, a winding drum carried by the boom, an agricultural implement, a hitch block engaged with the pin, means for coupling said implement to the hitch block to permit the implement to have vertical movement, suitably positioned guide pulleys carried by the portable structure, the boom and agricultural implement, a flexible member having one end portion secured to the drum and the opposite end portion operatively engaged with the pin, said flexible member being disposed around the guide pulleys to permit elevating of the agricultural implement upon rotation of the drum in one direction, driving means carried by the portable structure, and an operative connection between said driving means and drum.

5. In combination with a portable structure, a pin supported thereby, an operative connection between the lower portion of the pin and the portable structure, a boom operatively engaged with the lower portion of the pin, a brace coacting with the boom and portable structure, a winding drum carried by the boom, an agricultural implement, a hitch block engaged with the pin, means for coupling said implement to the hitch block to permit the implement to have vertical movement, suitably positioned guide pulleys carried by the portable structure, the boom and agricultural implement, a flexible member having one end portion secured to the drum and the opposite end portion operatively engaged with the pin, said flexible member being disposed around the guide pulleys to permit elevating of the agricultural implement upon rotation of the drum in one direction, driving means carried by the portable structure, an operative connection between said driving means and drum, the operative connection of the flexible member with the pin comprising a drum rotatably supported by the pin, said flexible member being secured to said drum and partly wound therearound when the agricultural implement is in its lowered position, said hitch block being slidable along the pin, and means connecting the drum of the pin and the hitch block for moving the hitch block upwardly of the pin upon initial pull being imposed by the drum of the boom upon the flexible member.

6. In combination with a portable structure, a hitch block, means for connecting the hitch block to the portable structure, said hitch block having a vertically disposed slot disposed transversely therethrough and having a vertically disposed slot in its rear end portion, a bar disposed through the first named slot, means carried by the block for adjusting the bar lengthwise of its slot, a coupling member extending within the block through the second named slot, said coupling member being operatively connected with the bar so that the bar and coupling member move together, an agricultural implement, and means for connecting the coupling member to the agricultural implement.

7. In combination with a portable structure, a hitch block, means for connecting the hitch block to the portable structure, said hitch block having a vertically disposed slot disposed transversely therethrough and having a vertically disposed slot in its rear end portion, a bar disposed through the first named slot, means carried by the block for adjusting the bar lengthwise of its slot, a coupling member extending within the block through the second named slot, said coupling member being operatively connected with the bar so that the bar and coupling member move together, an agricultural implement, means for connecting the coupling member to the agricultural implement, said bar extending beyond the side faces of the block, the agricultural implement including beams overlying the side faces of the block and provided with open slots to receive the extended portions of the bar, the means for connecting the coupling member to the agricultural implement being breakable under excessive strain.

8. In combination with a portable structure, means for connecting a hitch block therewith, said block being hollow and having vertically disposed slots in its side walls and rear wall, a bar extending through the hitch block and having movement within the slots in the side walls thereof, means carried by the block and engaging the opposite end portions of the bar for moving the bar lengthwise of the slots in the side walls of the block, a head within the block and through which the bar extends, said head having a bar extending out through the slot in the rear wall of the block, an agricultural implement, said agricultural implement including beams, a cross member connecting said beams through which the bar of the head is freely insertible, and a breakable pin carried by such bar for contact with the cross member to couple the beams to the bar.

9. In combination with a portable structure, means for connecting a hitch block therewith, said block being hollow and having vertically disposed slots in its side walls and rear wall, a bar extending through the hitch block and having movement within the slots in the side walls thereof, means carried by the block and engaging the opposite end portions of the bar for moving the bar lengthwise of the slots in the side walls of the block, a head within the block and through which the bar extends, said head having a bar extending out through the slot in the rear wall of the block, an agricultural implement, said agricultural implement including beams, a cross member connecting said beams through which the bar of the head is freely insertible, and a breakable pin carried by such bar for contact with the cross member to couple the beams to the bar, said beams extending in advance of the cross member and overlying the sides of the hitch block.

10. In combination with a portable structure, means for connecting the hitch block therewith, said block being hollow and having vertically disposed slots in its side walls and rear wall, a bar extending through the hitch block and having movement within the slots in the side walls thereof, means carried by the block and engaging the opposite end portions of the bar for moving the bar lengthwise of the slots in the side walls of the block, a head within the block and through which the bar extends, said head having a bar extending out through the slot in the rear wall of the block, an agricultural implement, said agricultural implement including beams, a cross member connecting said beams through which the bar of the head is freely insertible, and a breakable pin carried by such bar for contact with the cross member to couple the beams to the bar, said beams extending in advance of the cross member and overlying the sides of the hitch block, said beams having open slots to receive the end portions of the first named bar.

11. In combination with a portable structure, a vertically disposed pin carried thereby, a hitch block engaged with said pin, an agricultural implement including a beam, means for connecting the beam to the hitch block, and means operating in sequence and from a common source of power for first tilting the front end of the beam and then elevating the agricultural implement.

In testimony whereof we hereunto affix our signatures.

FRANK J. GALICK.
STEPHEN GALICK.